United States Patent [19]

Barfod

[11] Patent Number: 4,899,054

[45] Date of Patent: Feb. 6, 1990

[54] GAMMA CAMERA WITH IMAGE UNIFORMITY BY ENERGY CORRECTION OFFSETS

[75] Inventor: Jesper M. Barfod, Molle, Denmark

[73] Assignee: General Electric Company, Milwaukee, Wis.

[21] Appl. No.: 144,900

[22] Filed: Jan. 19, 1988

[51] Int. Cl.$^4$ .............................................. G01T 1/161
[52] U.S. Cl. ................................ 250/369; 250/363.07; 250/363.09
[58] Field of Search ............... 250/369, 363.07, 363.09

[56] References Cited

U.S. PATENT DOCUMENTS

| | | | |
|---|---|---|---|
| 4,095,108 | 6/1978 | Inbar et al. | 250/369 |
| 4,115,694 | 9/1978 | Lange et al. | 250/369 |
| 4,142,102 | 2/1979 | Lange | 250/369 |
| 4,151,416 | 4/1979 | Richey et al. | 250/363.07 |
| 4,223,221 | 9/1980 | Gambini et al. | 250/363.07 |
| 4,323,977 | 4/1982 | Arseneau | 250/369 |
| 4,424,446 | 1/1984 | Inbar et al. | 250/363 |
| 4,429,226 | 1/1984 | Inbar | 250/363 |
| 4,546,255 | 10/1985 | Knoll et al. | 250/369 |
| 4,588,897 | 5/1986 | Inbar et al. | 250/369 |
| 4,611,283 | 9/1986 | Lwnelsky et al. | 250/369 |

FOREIGN PATENT DOCUMENTS 0007698 6/1979 European Pat. Off. .

OTHER PUBLICATIONS

L. Stephen Graham, et al., "Effects of Asymmetric Photopeak Windows on Flood Field Uniformity and Spatial Resolution of Scintillation Cameras", Journal of Nuclear Medicine, vol. 27, No. 5, 1986, pp. 706-713.

B. David Collier, et al., "Gamma Camera Energy Windows for Tc-99m Bone Scintigraphy: Effect of Asymmetry on Contrast Resolution", Radiology, vol. 151, 1984, pp. 495-497.

Primary Examiner—Constantine Hannaher
Attorney, Agent, or Firm—James O. Skarsten; Douglas E. Stoner

[57] ABSTRACT

Inherent non-uniformities in a gamma camera system are compensated for by reducing the sensitivity for some locations on the detector. The tradeoff between image uniformity improvement and loss of camera sensitivity is maximized. Since the energy correction offsets direct the energy spectra downwards (or the energy window upwards). Scatter rejection is also improved.

14 Claims, 2 Drawing Sheets

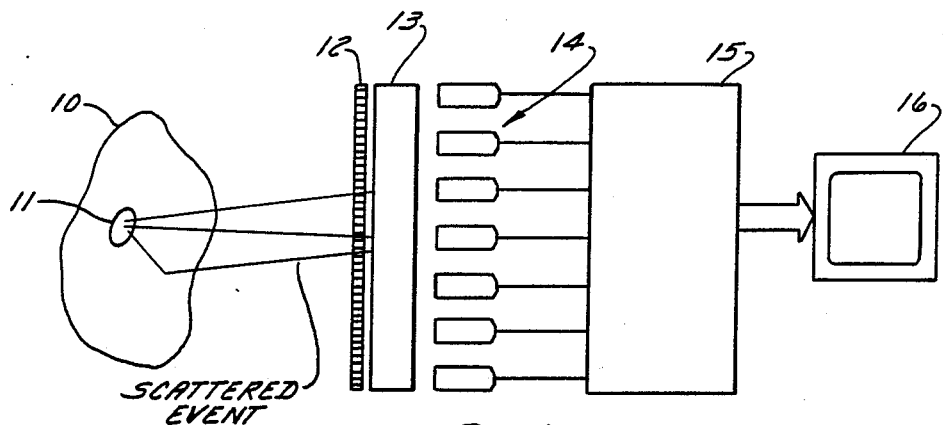
FIG. 1
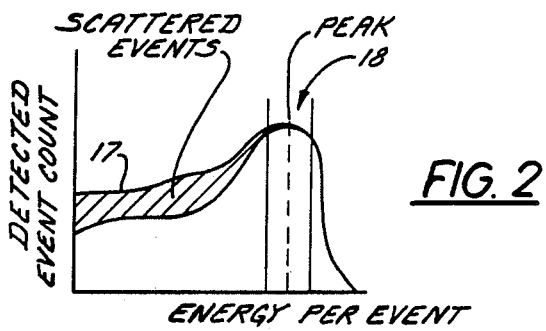
FIG. 2
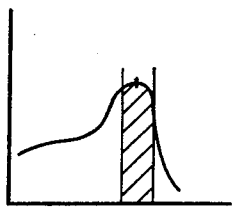 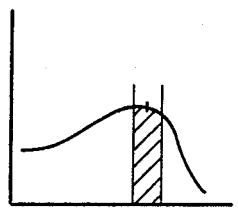 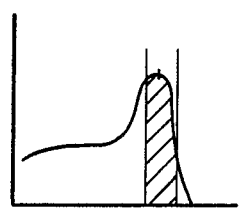
FIG. 3a  FIG. 3b  FIG. 3c
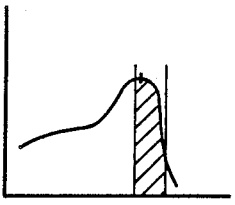 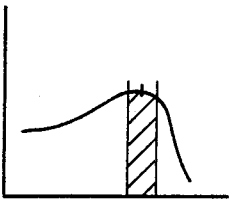 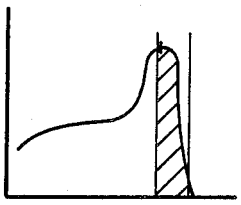
FIG. 4a  FIG. 4b  FIG. 4c

GAMMA CAMERA WITH IMAGE UNIFORMITY BY ENERGY CORRECTION OFFSETS

BACKGROUND OF THE INVENTION

The present invention relates in general to apparatus for detecting radioactivity and more specifically to a gamma camera having equalized sensitivity across detected images.

As a medical imaging modality, gamma cameras are employed for measurement of gamma rays emitted by radioactive pharmaceuticals concentrated in a body. The camera creates an image based on the distribution of radioactive emissions.

A particular type of gamma camera which employs a scintillation crystal to convert gamma events into visible photons and an array of photomultiplier tubes to detect the photons is known as the Anger camera. This device determines the position of each interaction of a gamma ray with the scintillator by measuring the relative visible light energy transmitted to each photomultiplier tube. The sum of energies from all photomultiplier tubes corresponding to an event gives a representation of the energy of the original gamma ray. Various signal correction techniques are typically employed to improve the linearity and energy response uniformity in images in a manner to compensate for the inherent imperfections of a detector.

In gamma cameras, gamma-photon events registered directly from the radioactive source are discriminated from scattered events by an energy discriminating window enclosing the peak of energy of visible light originated by unscattered scintillation as detected by the photomultiplier tubes. When using multiple energy isotopes, several windows can be employed.

Camera sensitivity to the energy of an incident gamma photon will vary with position, i.e., the maximum energy (photopeak) in an energy spectrum of a large number of measured events will vary with position of the incident gamma photon. Furthermore, the width of the spectrum peak (i.e., energy resolution) will vary with position. Both of these factors influence the area of the spectrum that falls inside the energy windows and hence influence the sensitivity of the camera depending on position. The unequal sensitivity with position results in non-uniformities in the recorded image when exposed to a uniform gamma photo flux or to gamma emission in a medical study.

Partial energy correction has been obtained in the prior art by employing an energy modifier dependent on position to align the photopeak of an energy spectrum with the center of a constant window. Equivalently, the energy window could be corrected by an offset depending on position to achieve the same result. Although alignment of the photopeak of the energy spectrum with a constant window improves sensitivity to the desired events, the image still contains non-uniformities due the variations in the shape of the energy spectra (energy resolution) with spatial position.

To compensate for variations in sensitivity with position due to vary energy resolution, a position-dependent window width has been applied. However, this procedure is difficult to implement and usually requires additional hardware.

Accordingly, it is a principal object of the present invention to provide a gamma camera having substantial uniformity in sensitivity throughout an image.

It is a further object of the invention to achieve image uniformity using a fixed window size.

It is another object of the invention to provide a method for finding energy correction offsets which result in image uniformity.

SUMMARY OF THE INVENTION

The sensitivity of the camera at a given position to an incident event is determined by the area of the energy spectrum falling inside the energy discrimination window. Thus, by changing the position of the spectrum to have more or less of the area near the photopeak fall within the window, the sensitivity can be varied within limits determined by the actual shape of the energy spectrum. For any given source distribution, scatter media distribution and camera configuration (including collimator) for which a uniform image is desired, the invention obtains position-dependent energy offset values that result in a uniform image.

In one aspect of the invention, an apparatus for detecting the energy and location of radiation events comprises an array of detectors responsive to the events and processing means responsive to the detectors for determining the location and energy of each event. The processing means employs an energy window to discriminate against events of other than selected energies. A plurality of energy offsets each corresponding to a respective location have a respective value providing substantial uniformity of sensitivity by location to said selected energies.

In another aspect of the invention, a method for deriving energy offsets for producing substantial uniformity between image pixels in a gamma camera comprises the steps of (1) recording a first uniform flood image to find a plurality of energy offsets, such that each energy spectrum peak corresponding to a respective pixel is aligned with an energy window (i.e., a certain energy value), (2) recording a second uniform flood image to produce an image using the energy offsets, (3) finding a base value of detected event density, and (4) adjusting the energy offsets corresponding to pixels having a number of detected events in excess of the base value in a manner to reduce sensitivity to the events by an amount corresponding to the respective excess.

BRIEF DESCRIPTION OF THE DRAWINGS

The novel features of the invention are set forth with particularity in the appended claims. The invention itself, as to organization and method of operation, together with further objects and advantages thereof, may best be understood by reference to the following detailed description in conjunction with the accompanying drawings in which:

FIG. 1 is a schematic representation of a gamma camera system.

FIG. 2 shows energy spectra for a plurality of detected events including scatter events.

FIGS. 3a–3c show energy spectra with different shapes each having an equal energy offset.

FIGS. 4a–4c show energy spectra having energy offsets which provide a uniform image.

DETAILED DESCRIPTION OF THE INVENTION

Figure 5:
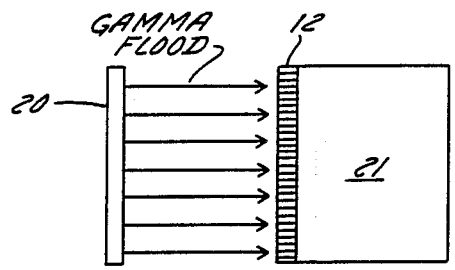
FIG. 5 depicts a uniform gamma flood for determining energy spectra and offsets according to the present invention.

Referring now to FIG. 1, an object 10, such as a patient, includes a source of gamma radiation 11, such as an organ which has concentrated a radioactive isotope. Radioactive emission is detected and displayed by a gamma camera system including a collimator 12, scintillation crystal 13, an array of photomultiplier tubes 14, a computer 15 and an imaging device 16. Collimator 12 lines up the gamma radiation in order to produce a meaningful image. Scintillation crystal 13 absorbs the gamma radiation and produces visible light photons which are detected by photomultiplier tubes 14. Scintillation crystal 13 is commonly comprises of thallium-doped sodium iodide. Signals from the array of photomultiplier tubes 14 are analyzed by computer system 15 to determine the location of the interaction between the gamma photon and the scintillation crystal 13 and to determine the energy of the interaction. Events having an incorrect energy are rejected and those falling within the energy discrimination window are displayed on imaging device 16 or stored by computer 15.

The contrast in an image detected by a gamma camera is dependent upon the amount of scatter in the detected energy spectrum. If a scattered emission is not rejected, an event will be placed into a pixel where no activity was actually present, thus reducing image contrast and causing a loss of information. As shown in FIG. 2, an energy window 18 can be employed to discriminate against scatter events included in an energy spectrum 17.

Ideally, the energy signal corresponding to a given event would be independent of the position of the event. However, a number of factors such as regional crystal differences or transparency, the quality of optical coupling between the crystal and the photomultiplier tubes and the photomultiplier tubes sensitivity and amplification give rise to positional variations in energy signal sensitivity.

It is known that by increasing the energy window upwards relative to the energy spectrum, it is possible to further discriminate against scattered events having low energy. Since scattered events lose energy, substantially all will be below the photopeak in the energy spectrum. However, if an energy window corresponding to each resolved pixel is increased from the respective photopeak by a constant amount, non-linearity in sensitivity will result because of non-uniformities in the energy resolution.

FIGS. 3a-3c show energy spectra having various shapes. With the energy window equally offset from each photopeak, the area of each spectrum within the energy window varies due to the different spectra shapes. These differences in area translate into differences in sensitivity.

Referring now to FIGS. 4a-4c show the present invention employs a pixel location dependent energy correction which places each energy spectrum relative to the energy window such that a predetermined area of the energy spectrum falls within the window. Thus, energy uniformity is achieved by obtaining equal areas for all pixel locations. Furthermore, by increasing the energy window relative to each spectrum, scatter rejection is improved while uniformity in sensitivity is achieved.

Energy spectra and offsets are obtained according to the present invention by using information obtained with reference to flood image recording as shown in FIG. 5. A source 20 provides a uniform gamma flood to collimator 12 and detector 21 containing, for example, scintillator crystal 13 and photomultiplier tube array 14.

Figure 6:
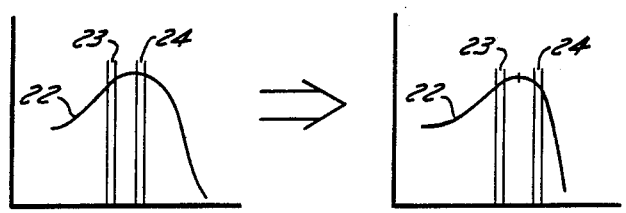
FIG. 6 shows the use of two energy windows to find the photopeak.

A first uniform flood image is recorded to determine the energy value of the photopeak for each pixel location. As shown in FIG. 6, a pair of narrow windows 23 and 24 are employed to determine the photopeak for an energy spectrum 22. During this first step to determine the photopeak, an initial energy correction offset (i.e., the position of windows 23 and 24 relative to spectrum 22) is used which represents the expected nominal photopeak based on the radio isotope being used. During the initial flood, a count is obtained for each window of the pair. If the energy spectrum at each location is correctly placed relative to the windows, then the counts obtained in each window will be equal and thus the two images will be of equal brightness. If the images are of different brightness, the spectrum is shifted to one side. From the difference in brightness and the values of the window pair, the amount by which the peak is shifted from the central point between the pair of windows can be calculated. Several iterations can be performed to accurately determine the value of the photopeak and thereby the location-dependent offset to the energy signal that makes the peak of the spectrum fall between the narrow windows.

In a preferred embodiment of the present invention, the correction table for storing the separate energy offsets required to align the energy spectrum of each pixel with energy window 18 is used by computer system 15. Alternatively, separate energy window values could be stored corresponding to each pixel location.

Figure 7:
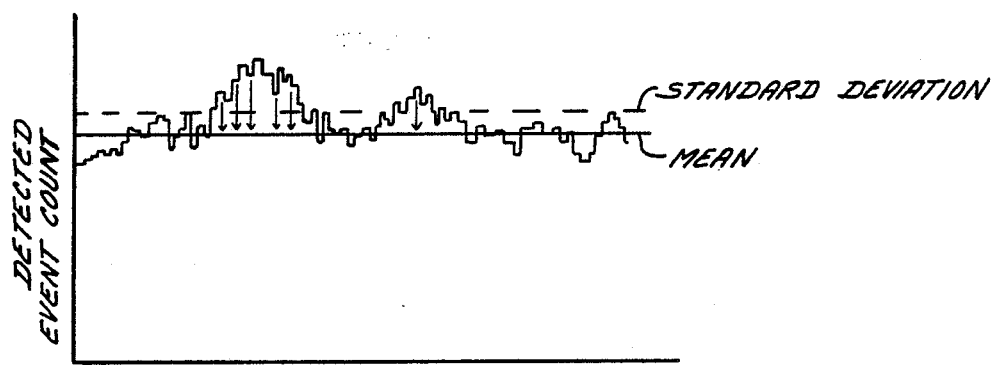
FIG. 7 plots pixel counts and pixel number for a non-uniform image.

Having obtained photopeak values and alignment energy offsets, another uniform flood image is recorded to obtain an image using the alignment energy offsets (i.e., aligned energy windows). The result of this uniform flood is an image containing non-uniformities for the reasons discussed with regard to FIGS. 3a-3c. FIG. 7 shows a plot of number of detected events (i.e., counts) for each pixel in a typical image. The count number varies due to the non-uniformity of the image. According to the invention, pixels corresponding to counts greater than a predetermined value are reduced to some lower value by reducing the area of the energy spectrum falling within the energy window as discussed with reference to FIGS. 4a-4c.

In a preferred embodiment of the invention, there is no attempt to reduce the sensitivity of all pixels to that of the least sensitive pixel since that would involve throwing away too much information. Therefore, only pixels having a count in excess of a threshold value are adjusted. In one embodiment, the threshold value is taken as the sum of the means pixel count plus the standard deviation from the mean for a predetermined set of pixels. The adjustment for each pixel having an excessive count is sufficient to reduce sensitivity to a point where a further uniform flood would produce a count equal to the mean.

Figure 8:
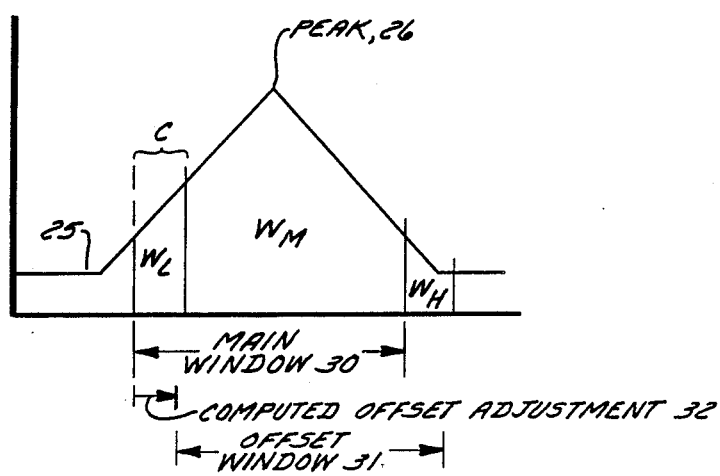
FIG. 8 shows a preferred embodiment of the invention using three energy windows to determine an energy offset.

A further preferred embodiment of the invention employs three energy windows during the uniform flood for uniformity correction as shown in FIG. 8. A lower window $W_L$, a middle window $W_M$ and a high window $W_H$ are used to generate pixel counts $I_L$, $I_M$, and $I_H$, respectively. The sum of windows $W_L$ and $W_M$ corresponds to a symmetrical energy window having peak 26 at its center. Thus, energy spectrum 25 is shifted by the alignment energy offset to center peak 26 in the combination of windows $W_L$ and $W_M$. Window $W_H$ is equal in width to window $W_L$ and is narrower than $W_M$. As shown in FIG. 8, windows $W_L$ and $W_M$ correspond to a main window 30 while the counts in windows $W_L$ and $W_H$ are employed to determine an offset window 31 or alternatively an energy offset 32. Windows $W_L$ and $W_H$ provide a measure of sensitivity to the offset correction. FIG. 8 approximates the energy spectrum as having a triangular shape with a slope of equal magnitude but opposite sign on either side of peak 26. This approximation simplifies the calculation of energy offset 32 which can be found according to the following formula:

$$\Delta E = C \times \sqrt{\frac{I_L + I_M - \text{BASE}}{I_L - I_H}}$$

where $\Delta E$ is the adjustment to the energy offset, C is proportional to or equal to the width of small windows $W_L$ and $W_H$ and BASE is the count level to which bright spots in the image are to be reduced. This calculation can only be performed if $I_L - I_H$ is positive since an increase in the energy window would otherwise increase the number of counts detected.

As shown above with reference to FIG. 7, a preferred method for determining the base value employs the mean count value and standard deviation for a set of pixels. In one embodiment, the set of pixels corresponds to a circle having a predetermined radius and centered in the center of the image is used to calculate the base value. For example, a radius of 55 pixels can be employed in a camera having a total field of view of 128 by 128 pixels. For pixels within the predetermined radius, the mean M and standard deviation S are determined. The base value is then determined according to the formula $M + (k \times S)$ where k is a predetermined constant which is preferably equal to 1. In one preferred embodiment, the energy offsets calculated by this formula are filtered by applying a two-dimensional low-pass filter to the set of offset values to reduce noise content.

The offset adjustment $\Delta E$ is subtracted from the energy offset contained in the correction table. The new energy correction table may then be used in obtaining images of high uniformity. The energy correction table further compensates for position-dependent photopeak variations, position-dependent energy resolution, position-dependent intrinsic crystal sensitivity variations and for collimator non-uniformities.

Although the present invention has been described primarily with reference to the use of energy offsets, it is equally applicable to position-dependent energy windows having adjustments according to pixel count. Furthermore, the present energy offset correction scheme can be employed with other correction techniques such as linearity correction.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for validating detected events in a gamma camera comprising the steps of:
    forming an energy signal corresponding to the energy of a detected event;
    determining the location of said event and whether said location has a sensitivity greater than a predetermined sensitivity, said location having a corresponding energy range and comprising a first location type if the sensitivity of said location is greater than said predetermined sensitivity and otherwise comprising a second location type;
    validating said detected event if said determined location is of a first location type and said energy signal falls within said corresponding range of energies as said range of energies is displaced in a manner to reduce said sensitivity to substantially said predetermined sensitivity; and
    validating said detected event if said determined location is of a second location type and said energy falls within said corresponding energy range without displacement of said range.

2. A gamma camera comprising:
    means for forming an energy signal corresponding to the energy of a detected event;
    means for determining the location of said event and whether said location has a sensitivity greater than a predetermined sensitivity, said location type having a corresponding energy range and comprising a first location if the sensitivity of the determined location is greater than said predetermined sensitivity and otherwise comprising a second location type,
    means for validating said detected event if said determined location is of a first location type and said energy signal falls within said corresponding range of energies as said range of energies is displaced in a manner to reduce said sensitivity to substantially said predetermined sensitivity; and
    means for validating said detected event if said determined location is of a second location type and said energy falls within said corresponding energy range without displacement of said range 3. Apparatus for detecting the energy and location of radiation events comprising:
    an array of detectors responsive to said events;
    processing means responsive to said detectors for determining the locations and energies of respective events by employing an energy window to discriminate against events of other than selected energies; and
    said processing means further comprises means for establishing first and second location groups, said first group including all of said locations having a number of events in excess of a threshold value and said second group including the remainder of said locations, said processing means employing energy offsets to selectively decrease the sensitivity at each of said first group of locations without changing the sensitivity at each of said second group locations.

4. The apparatus of claim 3 further comprising table means coupled to said processing means for storing the energy offset value corresponding to each of said first group locations.

5. The apparatus of claim 3 wherein each of said energy offsets is each selected to displace said window to decrease sensitivity at its corresponding first group location.

6. The apparatus of claim 3 wherein:
said apparatus includes scintillation means for emitting photons in response to incident gamma radiation events; and
said array of detectors is responsive to emitted photons.

7. The apparatus of claim 6 further comprising collimating means located between said scintillation means and a source of said gamma radiation for lining up said gamma radiation.

8. The apparatus of claim 6 further comprising table means coupled to said processing means for storing respective energy offset values.

9. A method for deriving energy offsets for producing substantial uniformity between image pixels in a gamma camera, said method comprising the steps of:
recording a first uniform flood image to find a plurality of energy offsets such that each energy spectrum peak corresponding to a respective pixel is aligned with an energy window;
recording a second uniform flood image using said energy offsets and said energy window;
finding a base value of detected events from said second uniform flood image which is greater than the number of detected events of a selected group of said pixels; and
adjusting the energy offsets corresponding to pixels having a number of detected events in excess of said base value in a manner to reduce sensitivity to said events by an amount corresponding to the respective excess, while holding constant the energy offsets corresponding to said selected pixels.

10. The method of claim 9 wherein said adjusted energy offsets are each decreased.

11. The method of claim 9 wherein said step of finding said base value for a particular pixel includes the steps of:
finding the mean number M of detected events for all pixels within a predetermined radius of a predetermined pixel;
finding the standard deviation S from said mean for said pixels within said predetermined radius; and
calculating said base value according to the formula $M+(k \times S)$ where k is a predetermined constant.

12. The method of claim 9 wherein said second uniform flood step uses a pair of energy windows for each pixel, said pair of energy windows being symmetrical about the respective energy peak, said amount of adjustment being related to the difference in counts between said pair of energy windows.

13. A method for deriving energy offsets for producing substantial uniformity of sensitivity between image pixels in a gamma camera, said method comprising the steps of:
recording a first uniform flood image to find a plurality of alignment energy offsets such that each energy spectrum peak corresponds to a respective pixel is aligned with an energy window;
recording a second uniform flood image to produce three pixel counts $I_L$, $I_M$ and $I_H$ corresponding to each respective pixel, said count $I_M$ corresponding to a middle energy window containing the respective energy peak, said count $I_L$ corresponding to a low energy window lower than and adjacent to said middle energy window, and said count $I_H$ corresponding to a high energy window higher than and adjacent to said middle energy window, the sum of said lower energy window and said middle energy window forming a symmetrical energy window about said respective energy peak;
finding a base value of detected counts corresponding to each pixel; and
calculating a respective adjustment amount to be subtracted from said alignment energy offset if the respective different of $I_L - I_H$ is positive and if the respective sum of $I_L + I_M$ is greater than the respective base value, each respective adjustment amount having a value $\Delta E$ according to the formula:

$$\Delta E = C \times \sqrt{\frac{I_L + I_M - \text{Base Value}}{I_L - I_H}}$$

where C is a predetermined constant.

14. The method of claim 13 further comprising the step of forming an energy correction table based on said energy offsets and said adjustment amounts.

* * * * *

UNITED STATES PATENT AND TRADEMARK OFFICE
CERTIFICATE OF CORRECTION

PATENT NO. : 4,899,054
DATED : Feb. 6, 1990
INVENTOR(S) : Jesper M. Barfod

It is certified that error appears in the above-identified patent and that said Letters Patent is hereby corrected as shown below:

Face Page, Abstract, line 7, change ". Scatter" to --, scatter--.

Col. 8, line 17 (Claim 13), change "corresponds" to --corresponding--.

Signed and Sealed this

Twenty-first Day of July, 1992

Attest:

DOUGLAS B. COMER

*Attesting Officer*     *Acting Commissioner of Patents and Trademarks*